Dec. 18, 1962 D. L. NICKERSON ETAL 3,068,522
METHOD AND APPARATUS FOR MOLDING COVERS ON SPHERICAL BODIES
Filed July 19, 1960 2 Sheets-Sheet 1
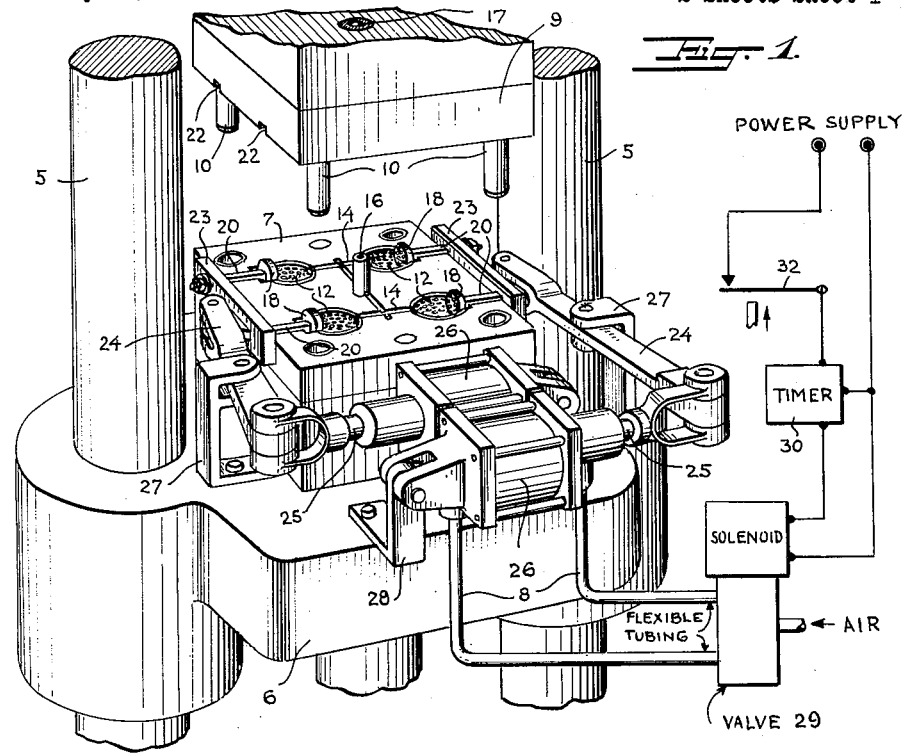
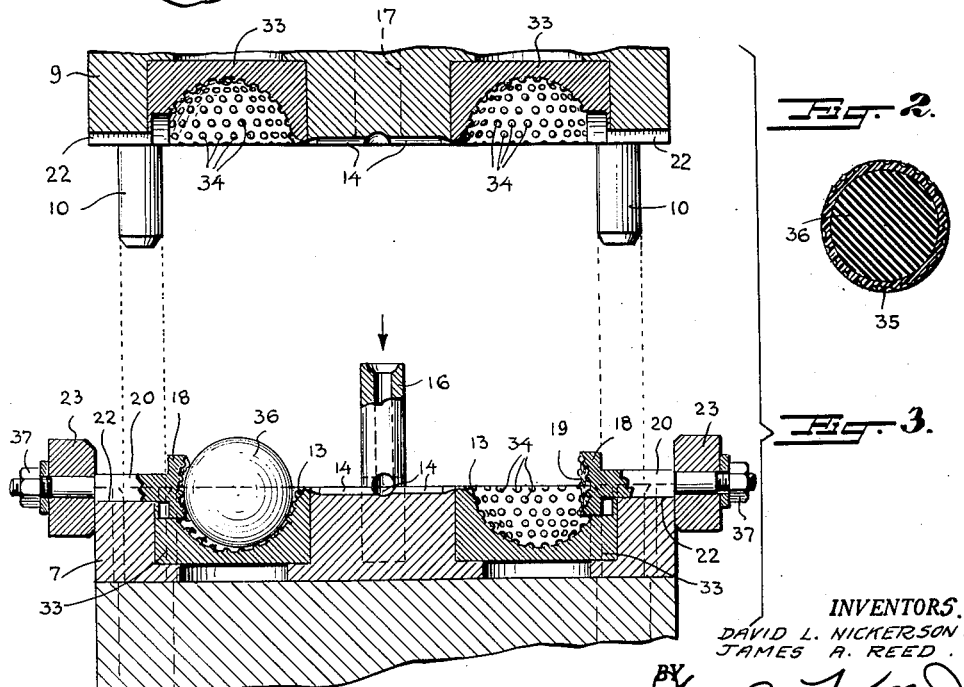
INVENTORS.
DAVID L. NICKERSON and
JAMES A. REED
BY
ATTORNEY.

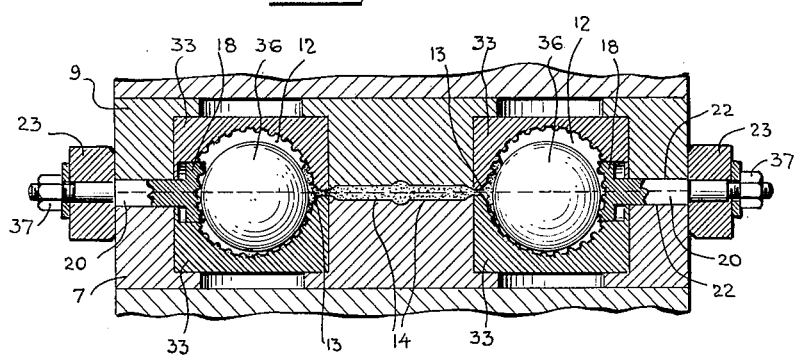
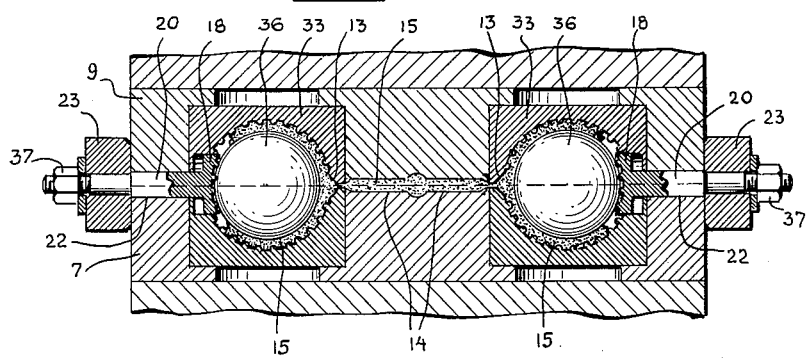
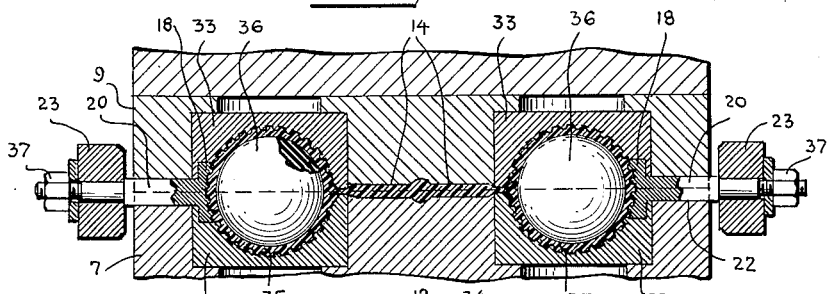
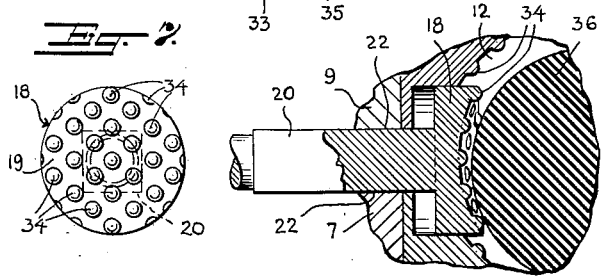

United States Patent Office 3,068,522
Patented Dec. 18, 1962

3,068,522
METHOD AND APPARATUS FOR MOLDING COVERS ON SPHERICAL BODIES
David L. Nickerson, 27 Leemond St., Wilbraham, Mass., and James A. Reed, 5 Elm St., Springfield, Mass.
Filed July 19, 1960, Ser. No. 43,945
12 Claims. (Cl. 18—36)

The present invention relates to a method and apparatus for molding covers on spherical bodies and more especially to the application of a molded cover of uniform thickness to a golf ball.

In the past attempts have been made to mold a cover of uniform thickness on golf balls but these have not been successful for several reasons. Difficulty has heretofore been encountered in holding the spherical body in the form of the wrapped resilient core in the precise center of the mold cavity so that the injected cover material will flow evenly over the surface and form a cover of uniform thickness. Such is due to the fact that the wrapped resilient core has been suspended upon pins the ends of which can readily pass between windings of the wrapped core rather than all uniformly bear against the outer surface of a winding. Also because of the sharpness of the pins the pressure of the injected cover material all too frequently pushes the wrapped resilient core against the pin ends so forcibly that they pierce the wrapped core still deeper resulting in an off-center core which inherently causes the cover to be much thicker over some areas than others and resulting in a faulty product.

It is accordingly the primary object of the present invention to provide a method of covering a spherical body which invariably results in a cover of uniform thickness.

Another object of the present invention is the provision of an apparatus for applying a cover to a spherical body such as a golf ball wherein the apparatus operates with precision and fidelity to produce a cover of uniform thickness.

A further object of the present invention is the provision of an apparatus wherein a cover of uniform thickness is applied to a spherical core body and which apparatus is exceptionally economical in its operation due to the speed and accuracy with which the final product is produced.

Still further objects of the present invention will become obvious to those skilled in the art by reference to the accompanying drawings wherein:

FIGURE 1 is a perspective view partly in section of portions of an injection molding apparatus provided with the molding die of the present invention, FIG. 2 is a cross-sectional view of a completely covered golf ball produced in accordance with the present invention, FIG. 3 is a fragmentary cross-sectional view on a somewhat enlarged scale showing the molding die of the present invention in its open position ready for reception of a spherical body in the form of a golf ball center or core.

FIG. 4 is a fragmentary cross-sectional view of the molding die of the present invention in its closed position with the golf ball cores deposited therein and the injected covering material just entering the spherical cavities, FIG. 5 is a fragmentary cross-sectional view identical to FIG. 4 and showing the golf ball cores in the retractable seats of the molding die and the flow of the injected core material a few seconds after injection into the spherical cavities is initiated, FIG. 6 is a view identical to FIGS. 4 and 5 but showing the retractable seats of the die in their fully retracted position and completion of the cover of uniform thickness on the spherical core preparatory to opening of the die and removal of the completed golf ball therefrom, FIG. 7 is an end view of the retractable seat and showing on a larger scale the inner concave surface thereof having a radius of curvature corresponding to that of the cavity wall of the die, and FIG. 8 is a fragmentary view on an enlarged scale and showing the initial position of the retractable seat of the die at the time that the golf ball core is deposited in the mold cavity and the die closed.

Referring now to the drawings more in detail the apparatus as shown more particularly in FIG. 1 comprises a molding press having the customary columnar slides 5 supporting a base member 6 which in turn carries the lower die 7 rigidly affixed thereto and held in a desired location. The lower die 7 is arranged to reciprocally move up and down on the slides 5 and is guided into mating alignment with the upper die 9 by the usual guide pins 10. It will be noted from FIG. 1 that the lower die 7 is shown provided with a plurality of hemispherical cavities 12 having slightly enlarged outwardly flaring entrance gates 13 to which horizontal channels 14 extend for the feeding of the injected cover material 15 (FIGS. 5 and 6) from a vertically disposed conduit 16 leading up through an opening 17 in the upper die 9 to a suitable source of cover material supply.

As shown in the drawing, each hemispherical cavity 12 is provided with a retractable seat 18 having its axis of movement coinciding with the axis of the entrance gate 13, which thus positions them diametrically opposite to each other in the illustrated embodiment of the present invention. By reference more particularly to FIGS. 7 and 8 it will be more clearly noted that the inner curved surface 19 of such retractable seat 18 has the same radius of curvature as that of the wall of the cavity 12 so that when the seat is retracted such curved surface 19 actually constitutes an integral part of the complete cavity wall, as seen in FIG. 6. The push rod portion 20 of each retractable seat 18 is arranged to slide in a groove 22 provided in each of the dies 7 and 9 which in the closed mating position of the latter forms a complete bearing passageway for the reciprocation of the retractable seat as well as a vent for the escape of air from the cavities 12.

In the interest of design simplicity and economy of operation, all retractable seats 18 are shown in FIG. 1 as operable simultaneously in pairs and since the construction of their operating mechanism is identical it should suffice to describe only one such mechanism. Accordingly, for the purpose of causing reciprocatory movement of the retractable seats 18 the outer ends of each pair of push rod portions 20, as shown in FIG. 1, are adjustably connected to a stop-bar 23 which in turn is pivotally connected to one end of a rocker arm 24 with the opposite end of the latter pivotally connected to a piston rod 25 projecting from an air cylinder 26.

The rocker arm 24 is pivotally supported by a bracket 27 carried by the base member 6 and the air cylinder 26 is similarly supported by a bracket or the like 28. Each end of each air cylinder 26 is connected through a solenoid-operated valve 29 to a suitable source of fluid pressure, such as indicated by the legend "air" in FIG. 1, and which solenoid valve 29 is operated at a predetermined time as preselected by the setting of a timer 30 under the control of a switch 32 included in the circuit with a suitable "power supply" source.

By reference to the enlarged showing of the remaining figures of the drawing it will be noted that the die cavities 12 are actually formed as metallic inserts 33 in the usual manner of compression and injection molding techniques, and the plated cavity surface is also highly polished as is customary to prevent sticking and facilitate removal of the finished molded article from the die. Also as shown in this particular instance the wall of the cavities 12 are provided with a multiplicity of rectangular or rounded projections 34 (as are the curved surfaces 19 of the retractable seats 18) which thus form the checkered or dimpled outer surface on the completed golf ball 35 as seen in FIG. 2. The surface of the channels 14, as well as that of the conduit 16 are likewise plated and highly polished to reduce friction and thus facilitate the steady flow of the injected coating material 15.

In the production of spherical bodies, such as a golf ball provided with a coating of uniform thickness in accordance with the present invention, the operator first deposits a customary wrapped resilient core 36 in the respective hemispherical cavities 12, and since in the open position of the die the retractable seats 18 are in their extended positions, such resilient core 36 assumes the eccentric position as can be seen from FIGS. 3 and 8. The extent to which the curved surface 19 protrudes beyond the cavity wall and into the cavity 12 itself is of course adjusted by the fastening nut 37 on the outer end of the push rod portion 20 of the retractable seat 18 and this depth of protrusion determines the thickness accuracy of the finished uniform coating on the completed ball. The area of the curved surface 19 of the retractable seat 18 must also be within certain limits. For example, it must not be greater than one half that of the cavity wall as otherwise it could not be readily retracted so as to form an integral continuation of the latter and the larger the area the quicker retraction must be made following initial injection of the cover material into the die cavities. By the same token this area must not be so small as to approach a point since this would completely eliminate any surface of curvature for practical purposes and at the same time would subject the core to the identical defects as previously existing of the pressure tending to cause the support to pierce the spherical core and thus destroy any possibility of obtaining a uniform coating. Accordingly, the area of the curved surface 19 should approximate not more than 40% nor less than about 10% of that of the complete cavity wall and hence that also of the spherical resilient core 36.

After depositing the spherical cores in the respective hemispherical cavities in the lower die 7 the operator causes operation of the molding press to raise and lower die 7 on the slides 5 to thus close the dies 7 and 9. Upon closure of these dies the complete spherical cavities 18 are thus formed and the channels 14 become passageways for the flow of injected coating material along with the formation of the bearing passageway for the movement of the push rod portions 20 of the retractable seats 18. Immediately following closure of the dies 7 and 9 to the position shown in FIG. 4 the injection of the coating material 15 is initiated which material flows from the customary reservoir (not shown) downwardly through the conduit 16 and then laterally out through the passageways formed by the mating channels 14 and into the respective cavities 12 through the outwardly flared entry gate 13. Since these entry gates are disposed coincident with an axis of the cavity 12 the pressure of the incoming injected coating material 15 contacts the surface of the eccentrically disposed resilient spherical core 36 (FIGS. 4 and 8) and immediately rolls or forces it into the seat formed by the curved surface 19 of the retractable seats 18 as shown in FIG. 5 where it is then maintained in a centralized position within the cavity 12 by the equal flow of the pressurized injected coating material in all directions over the surface of the spherical core 36, as can be appreciated from FIG. 5.

Simultaneously with the upward movement of the lower die 7 to closed position with the upper die 9, such upward movement also closes the switch 32 to complete an electrical circuit to the timer 30. Inasmuch as this timer 30 is set for a predetermined period of time following its energization, it will upon expiration of such time period cause closure of the energizing circuit to the solenoid-valve 29. Operation of this valve 29 then removes the previously existing pressure from one side of the pistons 25 of the respective air cylinders 26, which forced the retractable seats 18 into their extended position, and causes the air pressure to be applied through the flexible tubing 8 to the opposite end of the pistons 25. When so applied the pistons then move in an opposite direction causing the rocker arms 24 to rotate about their pivotal connection with the supporting bracket 27 which pulls the stop-bars 23 away from the lower die 7 along with movement of the push rod portions 20 longitudinally of their bearing passageway thus withdrawing the retractable seats 18 into nested position with their curved surfaces 19 then completing the wall surface of the respective spherical cavities 12 as shown in FIG. 6. The injection of the coating material automatically continues until it has completely flowed over the area previously occupied by the retractable seat 18 following venting of the air from the cavities 12 through their bearing passageways 22, to complete the uniform coating for the golf ball as can be seen in FIG. 6. The injection of the coating material 15 then automatically ceases upon lapse of this preset operation and the coating allowed to cool or "cure," after which the die is then moved again to its open position to enable removal of the complete uniformly coated golf balls from the mold cavities which can be facilitated by an air blast or ejector pins movable into the lower hemispherical cavities if desired. The solenoid valve 29 is also deenergized to again cause projection of the retractable seats 18 into the mold cavities 12 preparatory to the deposit of another resilient spherical core therein.

It should be apparent that the predetermined time period for which the timer 30 is preset is critical to the extent that it must be sufficient to cause closure of the energizing circuit for the solenoid-valve 29 and attendant withdrawal of the retractable seats 18 only after the injected coating material has flowed over the surface of the spherical core 36 beyond a plane taken through a central axis of such core. For example, in the specific embodiment as shown in the drawing wherein the single entry gate 13 is diametrically disposed on the axis of movement of the retractable seat 18, the injected coating material should be allowed to flow well beyond a plane coinciding with the vertical axis of the spherical core 36 to about the perpendicular plane shown in FIG. 5 which thus assures maintenance of the spherical core 36 centrally of the cavity 12 by the covering material itself before and after withdrawal of the retractable seat 18 and until the cover is completely formed by covering the area previously occupied by the seat prior to retraction, as above mentioned.

Moreover, as to just what such predetermined period of time must be in actual seconds is governed entirely by the usual molding technique factors. The latter obviously comprise the type of injected covering material, whether of the thermosetting or thermoplastic type, and if the latter the maintenance of a sufficiently high temperature from reservoir to mold cavity to prevent retarding of flow rate or pre-hardening of the injected coating material before it has flowed completely over the cooler spherical core body. To avoid difficulties of this character in some instances it is necessary to heat the molding dies and perhaps to pre-heat the spherical core to a temperature slightly above ambient. Material type, temperature, and flow rate likewise affect the total cycle time of operation in producing a golf ball with a coating of uniform thickness but this can be accurately predetermined simply by proper selection of these customary factors.

By employing the method and apparatus of the present invention and using a high rubber content thermoplastic possessing the properties of toughness and ductility, using die temperatures at about 100° F. above ambient, and with about a ten second time delay prior to withdrawing of the retractable seats, satisfactory golf balls having exceptionally uniform cover thickness have been produced in a total cycle time of approximately one minute.

It should thus be obvious to those skilled in the art from the foregoing that a method and apparatus is herein provided which with continued fidelity produces golf balls having a uniform thickness of coating within an exceptionally short total time cycle of operation. Also, while the specific embodiment of the present invention as herein shown and described employs only four mold cavities, the molding dies can be readily made larger so as to accommodate a still greater number of such cavities. In some instances it may likewise be desirable to precoat the resilient cores to provide a thermal shield due to the molding temperatures required for certain coating materials.

It should accordingly be understood that although only one diametrically disposed entry gate for the injected cover material is illustrated, a larger number of such entry gates can be utilized if desired so long as they are symmetrically disposed in the cavity wall and on one side of a plane coinciding with a central axis perpendicular to the axis of movement of the retractable seats and at an angle greater than normal to such axis which will thus assure equalization of the pressure of the injected cover material over the surface area to maintain the spherical core in the retractable seat and thus centralized within the mold cavity. It is believed to be equally obvious that although a molding press has been shown and described wherein the lower die moved upwardly into mating arrangement with the upper die, the reciprocatory movement therebetween can just as readily be reversed and likewise instead of a vertical molding press one operable horizontally can also be utilized.

We claim:

1. The method of molding a cover of uniform thickness on a spherical body in a die cavity having a retractable seat comprising depositing the spherical body in the die, injecting a coating material into said die at a position between said spherical body and the adjacent die wall so that the coating material will flow about the entire surface of said spherical body to force it into and hold it in said retractable seat to thus center said spherical body in the die cavity, continuing the injection of the coating material until it approaches the area of the spherical body occupied by said retractable seat to independently maintain said spherical body centrally of said die cavity, and then retracting said seat into the wall of said die to allow the coating material to continue its flow over the area previously occupied by the seat and form a complete cover of uniform thickness on said spherical body.

2. The method of molding a cover of uniform thickness on a spherical body in a die cavity having a retractable seat comprising depositing the spherical body in the die, injecting a coating material into said die at an angle greater than normal to the axis of movement of said retractable seat and between said spherical body and the adjacent die wall so that the coating material will flow about the entire surface of said spherical body to force it into and hold it in said retractable seat to thus center said spherical body in the die cavity, continuing the injection of the coating material until it approaches the area of the spherical body occupied by said retractable seat to independently maintain said spherical body centrally of said die cavity, and then retracting said seat into the wall of said die to allow the coating material to continue its flow over the area previously occupied by the seat and form a complete cover of uniform thickness on said spherical body.

3. The method of molding a cover of uniform thickness on a spherical body in a die cavity having a retractable seat comprising depositing the spherical body in the die, injecting a coating material into said die at a position between said spherical body and the adjacent die wall so that the coating material will flow about the entire surface of said spherical body to force it into and hold it in said retractable seat to thus center said spherical body in the die cavity, continuing the injection of the coating material until it approaches the area of the spherical body occupied by said retractable seat to independently maintain said spherical body centrally of said die cavity, retracting said seat into the wall of said die to permit the coating material to continue its flow over the area previously occupied by the seat and form a complete cover of uniform thickness on said spherical body, allowing said uniform coating on said body to set, and removing the completely coated spherical body from said die.

4. The method of molding a cover of uniform thickness on a spherical body in a die cavity having a retractable seat comprising depositing the spherical body in the die, injecting a coating material into said die between the cavity wall and said spherical body on one side of the vertical axis thereof so that the coating material will flow over the entire surface of said spherical body and cause it to move into said retractable seat and center itself within said die, continuing the injection of the coating material until it approaches the area of said spherical body occupied by said retractable seat to independently maintain said spherical body centrally of said die cavity, and then retracting said seat into the wall of said die to allow the coating material to continue its flow over the area previously occupied by the seat and form a complete cover of uniform thickness on said spherical body.

5. The method of molding a cover of uniform thickness on a spherical body in a die cavity having a retractable seat comprising depositing the spherical body in the die, injecting a coating material into said die between the cavity wall and said spherical body on one side of the vertical axis thereof so that the coating material will flow over the entire surface of said spherical body and cause it to move into said retractable seat and center itself within said die, continuing the injection of the coating material until it approaches the area occupied by said retractable seat to independently maintain said body in centralized position within said die, then retracting said seat into the wall of said die to permit the coating material to continue its flow over the area previously occupied by the seat and form a complete cover of uniform thickness on said spherical body, allowing said uniform coating on said body to set, and removing the completely coated body from said die.

6. An apparatus for molding a cover upon a spherical body comprising upper and lower dies having open and closed positions relative to each other and forming at least one spherical cavity in their closed position for the reception of said spherical body, a retractable seat having an inner surface within said cavity of the same radius of curvature as the latter and initially spaced from the interior wall of said cavity when a spherical body to be covered is deposited therein, means for injecting a cover material into said cavity between the wall thereof and said deposited spherical body including an entry gate in said cavity on the opposite side of the center thereof to said retractable seat and disposed at an angle greater than normal to the axis of movement of the latter to cause the flow of injected cover material to force said spherical body into the curvature of said retractable seat and hold it centralized within said cavity, and means operable to cause movement of said seat and retraction of its curved surface into the wall of said cavity when said material approaches said retractable seat to permit the covering material to independently hold said centralized body and continue its flow over the area of said body previously occupied by said curved surface and complete the cover of uniform thickness for said spherical body.

7. An apparatus for molding a cover upon a spherical body comprising upper and lower dies having open and closed positions relative to each other and forming at least one spherical cavity in their closed position for the reception of said spherical body, a retractable seat having an inner surface within said cavity of the same radius of curvature as the latter and initially spaced from the interior wall of said cavity when a spherical body to be covered is deposited therein, means for injecting a cover material into said cavity between the wall thereof and said deposited spherical body including an entry gate in said cavity on the opposite side of the center thereof to said retractable seat and disposed at an angle greater than normal to the axis of movement of the latter to cause the flow of injected cover material to force said spherical body into the curvature of said retractable seat and hold it centralized within said cavity, and means operable within a predetermined period of time following initial injection of said cover material into said cavity and the flow thereof in proximity to said seat to cause movement of said seat and retraction of its curved surface into the wall of said cavity to permit the covering material to independently hold said centralized body and continue its flow over the area of said body previously occupied by said curved surface and complete the cover of uniform thickness for said spherical body.

8. An apparatus for molding a cover upon a spherical body comprising upper and lower dies having open and closed positions relative to each other and forming at least one spherical cavity in their closed position for the reception of said spherical body, a retractable seat having an inner surface within said cavity of the same radius of curvature as the latter and of sufficient arcuate area to hold said spherical body centralized within said cavity against displacement by the pressure of the injected cover material, and with said curved surface being initially spaced from the interior wall of said cavity when a spherical body to be covered is deposited therein; means for injecting a cover material into said cavity between the wall thereof and said deposited spherical body including an entry gate in said cavity on the opposite side of the center thereof to said retractable seat and disposed at an angle greater than normal to the axis of movement of the latter to cause the flow of injected cover material to force said spherical body into the curvature of said retractable seat and hold it centralized within said cavity, and means operable after initial injection of said cover material into said cavity and the flow thereof in proximity to said seat to cause movement of said seat and retraction of its curved surface into the wall of said cavity to permit the covering material to independently hold said centralized body and continue its flow over the area of said body previously occupied by said curved surface and complete the cover of uniform thickness for said spherical body.

9. An apparatus for molding a cover upon a spherical body comprising upper and lower dies having open and closed positions relative to each other and forming at least one spherical cavity in their closed position for the reception of said spherical body, a retractable seat having an inner surface within said cavity of the same radius of curvature as the latter and initially spaced from the interior wall of said cavity when a spherical body to be covered is deposited therein, means for injecting a cover material into said cavity between the wall thereof and said deposited spherical body including an entry gate diametrically disposed to said retractable seat and on the axis of movement thereof to cause the flow of injected cover material to force said spherical body into the curvature of said retractable seat and its continued flow to independently hold said body centralized within said cavity, and means operable to cause movement of said seat and retraction of its curved surface into the wall of said cavity to permit the covering material to independently hold said centralized body and continue its flow over the area of said body previously occupied by said curved surface and complete the cover of uniform thickness for said spherical body.

10. An apparatus for molding a cover upon a spherical body comprising upper and lower dies having open and closed positions relative to each other and forming at least one spherical cavity in their closed position for the reception of said spherical body, a retractable seat having an inner surface within said cavity of the same radius of curvature as the latter and initially spaced from the interior wall of said cavity when a spherical body to be covered is deposited therein, means for injecting a cover material into said cavity between the wall thereof and said deposited spherical body including an entry gate diametrically disposed to said retractable seat and on the axis of movement thereof to cause the flow of injected cover material to force said spherical body into the curvature of said retractable seat and its continued flow to independently hold said body centralized within said cavity, and means operable within a predetermined period of time following initial injection of said cover material into said cavity to cause movement of said seat and retraction of its curved surface into the wall of said cavity to permit the covering material to continue its flow over the area of said body previously occupied by said curved surface and complete the cover of uniform thickness for said spherical body.

11. An apparatus for molding a cover upon a spherical body comprising upper and lower dies having open and closed positions relative to each other and forming at least one spherical cavity in their closed position for the reception of said spherical body, a retractable seat having an inner surface within said cavity of the same radius of curvature as the latter and of sufficient arcuate area to hold said spherical body centralized within said cavity against displacement by the pressure of the injected cover material, and with said curved surface being initially spaced from the interior wall of said cavity when a spherical body to be covered is deposited therein; means for injecting a cover material into said cavity between the wall thereof and said deposited spherical body including an entry gate diametrically disposed to said retractable seat and on the axis of movement thereof to cause the flow of injected cover material to force said spherical body into the curvature of said retractable seat and its continued flow to independently hold said body centralized within said cavity, and means operable after initial injection of said cover material into said cavity and the flow thereof in proximity to said seat to cause movement of said seat and retraction of its curved surface into the wall of said cavity to permit the covering material to continue its flow over the area of said body previously occupied by said curved surface and complete the cover of uniform thickness for said spherical body.

12. An apparatus for molding a cover upon a spherical body comprising upper and lower dies having open and closed positions relative to each other and forming at least one spherical cavity in their closed position for the reception of said spherical body, a retractable seat having an inner surface within said cavity of the same radius of curvature as the latter and of sufficient arcuate area to hold said spherical body centralized within said cavity against displacement by the pressure of the injected cover material, and with said curved surface being initially spaced from the interior wall of said cavity when a spherical body to be covered is deposited therein; means for injecting a cover material into said cavity between the wall thereof and said deposited spherical body including an entry gate diametrically disposed to said retractable seat and on the axis of movement thereof to cause the flow of injected cover material to force said spherical body into the curvature of said retractable seat and its continued flow to independently hold said body centralized within said cavity, and means operable within a predetermined period of time following initial injection of said cover material into said cavity and the flow thereof in proximity to said seat to cause movement of said seat and retraction of its curved surface into the wall of said cavity to permit the covering material to continue its flow over the area of said body previously occupied by said curved surface and complete the cover of uniform thickness for said spherical body.

References Cited in the file of this patent

UNITED STATES PATENTS

| | | |
|---|---|---|
| 2,076,412 | Oldham | Apr. 6, 1937 |
| 2,162,563 | Oldham | June 13, 1939 |
| 2,361,348 | Dickson et al. | Oct. 24, 1944 |
| 2,405,329 | Ruebensaal | Aug. 6, 1946 |
| 2,825,093 | High | Mar. 4, 1958 |